United States Patent [19]

Thompson

[11] 4,248,338
[45] Feb. 3, 1981

[54] ROTATOR FOR INSPECTING CONTAINERS

[75] Inventor: Leon E. Thompson, Butler, Pa.

[73] Assignee: American Glass Research, Inc., Butler, Pa.

[21] Appl. No.: 40,421

[22] Filed: May 18, 1979

[51] Int. Cl.³ .......................................... B65G 47/24
[52] U.S. Cl. ................................ 198/379; 198/344
[58] Field of Search ........................ 198/344, 379; 209/522-533

[56] References Cited

U.S. PATENT DOCUMENTS

| 3,101,848 | 8/1963 | Uhlig | 198/344 X |
| 3,428,174 | 2/1969 | Kulig | 198/379 X |
| 3,848,742 | 11/1974 | Krenmayr | 198/344 X |
| 3,901,381 | 8/1975 | Quinn | 198/344 X |

*Primary Examiner*—Jeffrey V. Nase
*Attorney, Agent, or Firm*—Kenyon & Kenyon

[57] ABSTRACT

A device for interrupting the travel of an object, such as a container, on a conveyor belt during a manufacturing operation includes a driven wheel and at least one idler resiliently urged towards the drive wheel. Both wheels are spaced apart a distance less than the diameter of the object. The drive wheel turns in a direction tending to move an object in the pocket in the direction of the conveyor. By stopping rotation of the idler, the object is rolled through the space between the wheel and the idler, the idler giving way for it.

17 Claims, 5 Drawing Figures

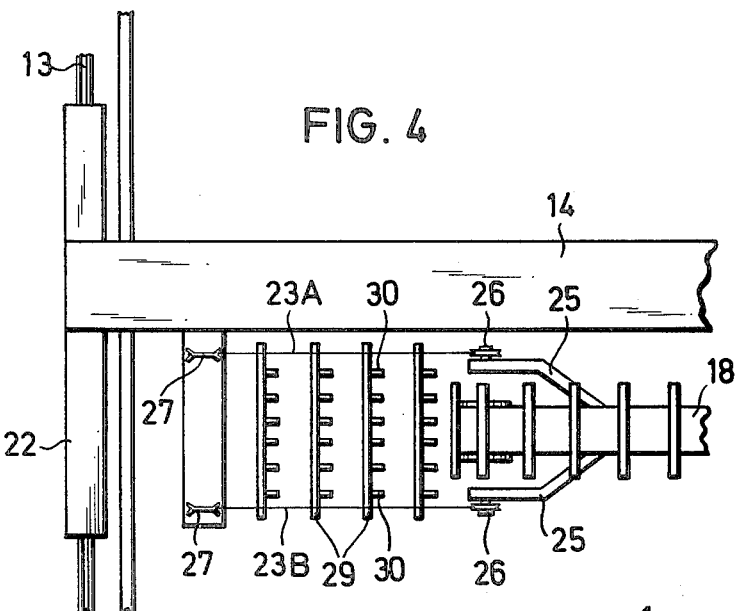
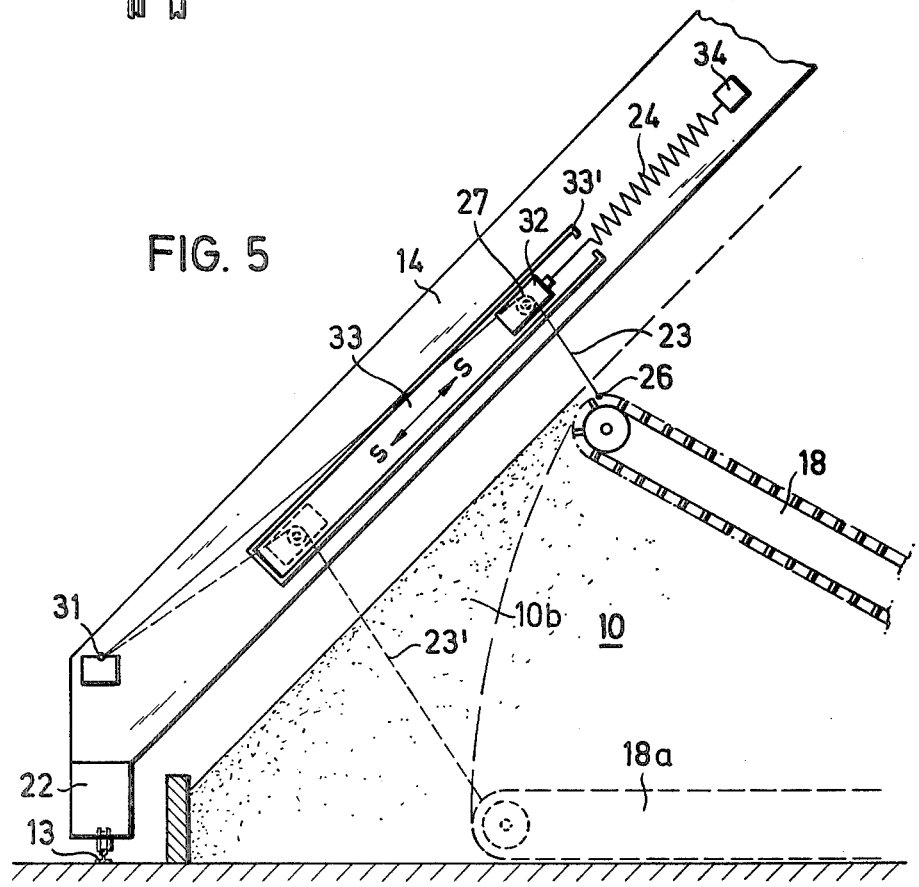

ROTATOR FOR INSPECTING CONTAINERS

BACKGROUND OF THE INVENTION

1. Field of the Invention

This invention relates to container handling apparatus and more particularly to mechanisms for use in inspecting containers on a production line. More particularly, the invention relates to a mechanism for stopping movement of a container on a conveyor so that it may be inspected.

2. Description of the Prior Art

During manufacture, it is necessary to inspect the containers for defects, satisfactory code markings, and the like, so as to make certain that a product of the desired quality is being produced and it is most convenient if the inspection can be carried out without hand manipulation. In some cases only the sides and top of a container need be inspected, and in others the bottom must also be seen. In the first instance, it may not be necessary to remove the container from the conveyor belt on which it is being moved from one point to another during the production process; in the other instance, some means of viewing the bottom must be provided and it is necessary to remove the container from the conveyor position for inspection, and then return it to the conveyor. Also, some inspections can be carried out while the container is rotating and others are best performed while the container is stopped.

Prior art devices are known for stopping the motion of a container in translation on a conveyor and for rotating it for inspection. These devices use moving cams or pairs of idlers, activated by air cylinders or solenoids, to push the containers against a rotating drive wheel or moving belt which then rotates the container for as long as the container is held in position against it by the idlers. When the idlers are pulled back, the container is released and can move forward on the conveyor belt.

The known devices have a number of disadvantages. One of these is that the rate at which containers can be handled is low. Accordingly, some machines are provided with more than one station, but this requires the use of an indexing device which is large and slow and utilizes considerable power in its operation. Most of these devices are synchronous and require a screw or star wheel infeed to assure proper positioning of the container. Also, such devices operate continuously, whether a container is present or not.

Desirably, the structure for stopping and rotating a container should be as uncomplicated as possible to provide for ease of manufacture and maintenance. The device should be passive, operating only when a container is present, and should be capable of accepting containers at present day production line rates. Lastly, the device should be easy to set up and to change for the many different sizes and shapes of containers that are characteristic of the product mix of present day container fabricators.

SUMMARY OF THE INVENTION

The above objects and others, which will become apparent from a reading of the following specification, are solved by the present invention of a rotator unit having an inspection pocket which is formed by the inward facing surfaces of a drive member and of at least one freely moving member positioned to receive a container being carried on a conveyor belt. Before entering the pocket, the container is aligned with the pocket by at least one guide bar. It then enters the pocket where its movement is stopped. The driving member has a surface which provides a substantial coefficient of friction between itself and the container and, when the container is stopped in the pocket, is rotated in place by the drive member.

In a second embodiment, the container first moves past an additional freely moving member, the surface of which forms a part of the pocket, and, together with the surfaces of the drive member and the "first" freely moving member, forms a pocket which embraces the container from three directions.

In both embodiments, the "first" freely moving member mentioned is equipped with a brake; when the brake is actuated, the member stops turning and, by frictionally engaging the container surface, causes the container to pivot about the point of contact with the idler wheel. As the turning force applied to the container by the driving wheel continues, the container rotates out of the pocket, and is freed once more to travel with the conveyor belt.

In another embodiment of the invention, a belt drive section is positioned over the conveyor belt so that a surface of a drive belt carried by the section intercepts a container which is travelling on the conveyor. The container contacts the belt and moves laterally on the belt into engagement with a backup bar which urges the container into continued engagement with the moving belt. In a preferred embodiment, the belt drive section is triangular and has an apex towards which the container is now moved. Upon reaching the apex of the drive section, the container encounters a spring loaded idler wheel which urges it against the belt, or a drive wheel associated with the belt so that it starts to round the apex. Part way around the apex, it encounters a second idler wheel. The container then stops travelling, but continues to be driven in rotation by the drive belt or the drive wheel.

The supporting table forming the floor of the pocket may be transparent, permitting visual inspection of the bottom. Upon completion of the inspection, rotation of the second idler is stopped, and the conveyor then resumes its rolling travel out of the pocket, being directed by the action of the spring loaded second idler onto the drive belt as it proceeds back on the other face of the drive section onto the conveyor belt. Along this path of travel, the container is held against the drive belt leg on an outfeed backup bar.

If it is desirable to stop the container while it is in the inspection pocket, one embodiment of the invention provides for stopping motion of the surface driving the container by a brake so that the container is no longer driven in rotation. After the inspection, motion of the drive surface is started again and rotation of the second idler is stopped, freeing the container for travel into the remainder of the production process as described above.

BRIEF DESCRIPTION OF THE DRAWINGS

FIG. 5 is a schematic illustration of still another embodiment of the invention.

DETAILED DESCRIPTION OF THE INVENTION

Figure 1:
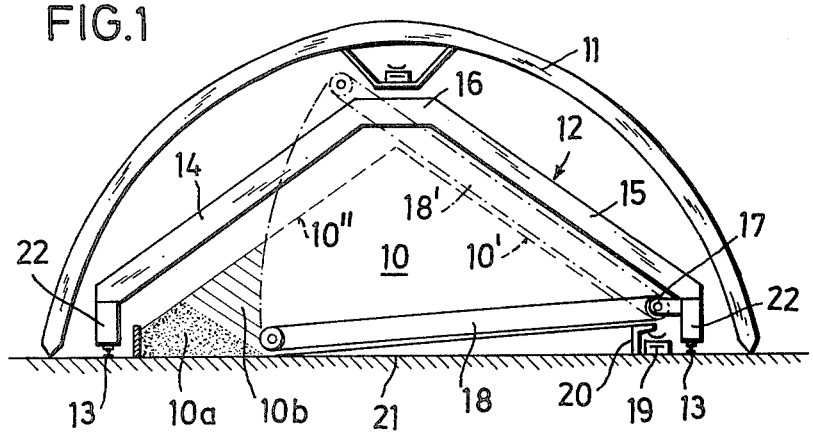
FIG. 1 is a schematic diagram showing the application of the teachings of the invention to an inspection station on a moving belt.
Figure 6:
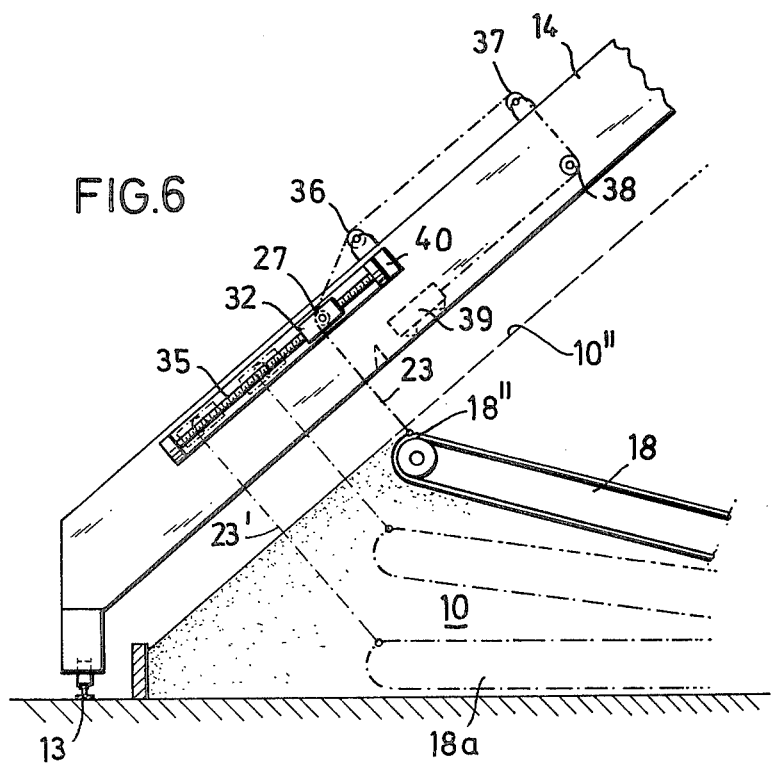

Reference is now made to FIG. 1 in which a conveyor belt 4, forming part of an assemblage of production equipment, is provided for moving a container, such as a newly formed bottle, from the production line towards a packing station or the like. The bottle is usually round, although it may be oval or square, or of some other cross-sectional configuration. The same automatic production equipment is used for producing a variety of shapes and sizes, being adapted therefor, between production runs, by changing mold sizes and configurations and making appropriate adjustments in the handling equipment.

The conveyor belt 4 of FIG. 1 moves past a drive wheel 10 which is supported over it by arm 11. Driving wheel 10 is turned by a motor 13 (see the block diagram in FIG. 1a.) which is supplied with electricity via connecting lead 9. Drive wheel 10 is placed near one edge of conveyor belt 4, and, may be carried with its motor, etc. by a stanchion supported by the base (not shown) carrying the conveyor belt and, as will be understood by those skilled in the art, may be adapted for adjustment towards and away from the center of the belt to accommodate containers of different sizes. Driving wheel 10 may carry a band of non-skid material 17 to improve frictional engagement with the surface of the container. First and second idler wheels 34 and 42 are also positioned over conveyor belt 4, being held there on sliding members 35 and 37, which are guided for motion back and forth across belt 4 by guides 39 and 41. Motion of each idler away from the center line of conveyor 4 is resisted by compression springs 43 and 45, respectively. As was the case with drive wheel 10, idler wheels 34 and 42, along with their resilient carriers, can be adjusted towards and away from the belt to accommodate different container sizes. Idler wheel 42 is equipped with a brake 44 for stopping its rotation relative to support arm 37.

Guide bars 47 and 49 are placed in front of idler wheel 34 and drive wheel 10, respectively, in the direction from which the belt is travelling, and serve to center the containers for entry into the pocket. The containers, it will be noted, may be spaced apart at random on the conveyor belt.

If the device of FIG. 1 is intended to be used simply for the purpose of stopping forward motion of a container on the belt and to drive it in rotation for inspection of the top and sides, drive wheel 10 may be in continuous operation. If it is necessary to have no movement of the container during its stay in the pocket, then, either the motor which drives wheel 10 may be stopped, or the clutched and braked drive wheel of FIG. 1a may be used. There, electric power, supplied via connecting line 9, is supplied to motor 13, which, in turn, drives shaft 7. Shaft 7 turns drive wheel 10 through slip clutch 15. Brake 56 can be pressed against wheel 10 to stop its rotation. If desired, brake 56 can be electrically operated by the operator or by a mechanism which is timed to allow an appropriate inspection interval at a frequency appropriate to the production rate of the equipment.

In operation, a container, travelling on belt 4, is guided by guide bars 47 and 49 into contact with first idler wheel 34. As the belt moves the container along, the end of guide bar 49 nearest drive wheel 10 and idler wheel 34 urges the container into engagement with idler wheel 34, causing it to be displaced away from the original line of travel of the container. The container stays in contact with idler 34 as it moves next into contact with drive wheel 10 and then into contact with second idler wheel 42. The container then centers itself in the embrace of the moving surfaces of drive wheel 10 and of idler wheels 34 and 42 and rotates, being held against further travel on the conveyor belt.

Figure 1A:
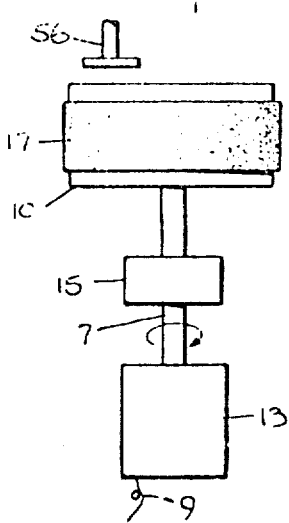
Figure 3:
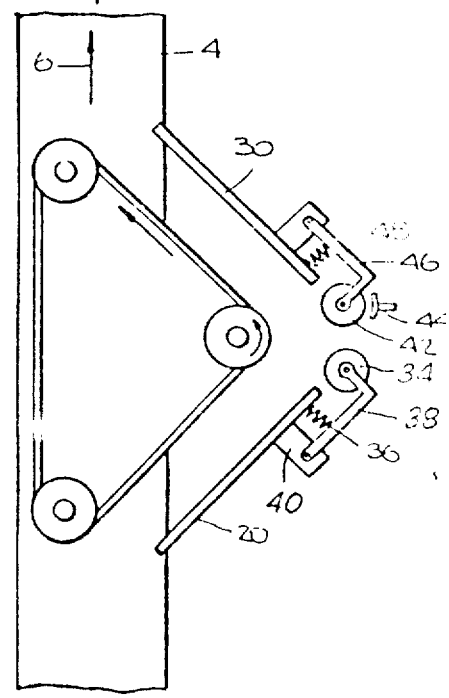

In the case of a machine equipped with the drive wheel illustrated in FIG. 1a, the drive wheel may be stopped, by actuating brake 56, so that the container does not rotate and so that an operation requiring a stationary container may be performed. Brake 56 is then released and the container is moved on by activating brake 44 and locking second idler wheel 42 against rotation. The container continues to be driven in rotation and, using the surface of idler wheel 42 as a pivot point, moves out of the pocket and is carried away on conveyor belt 6.

Figure 2:
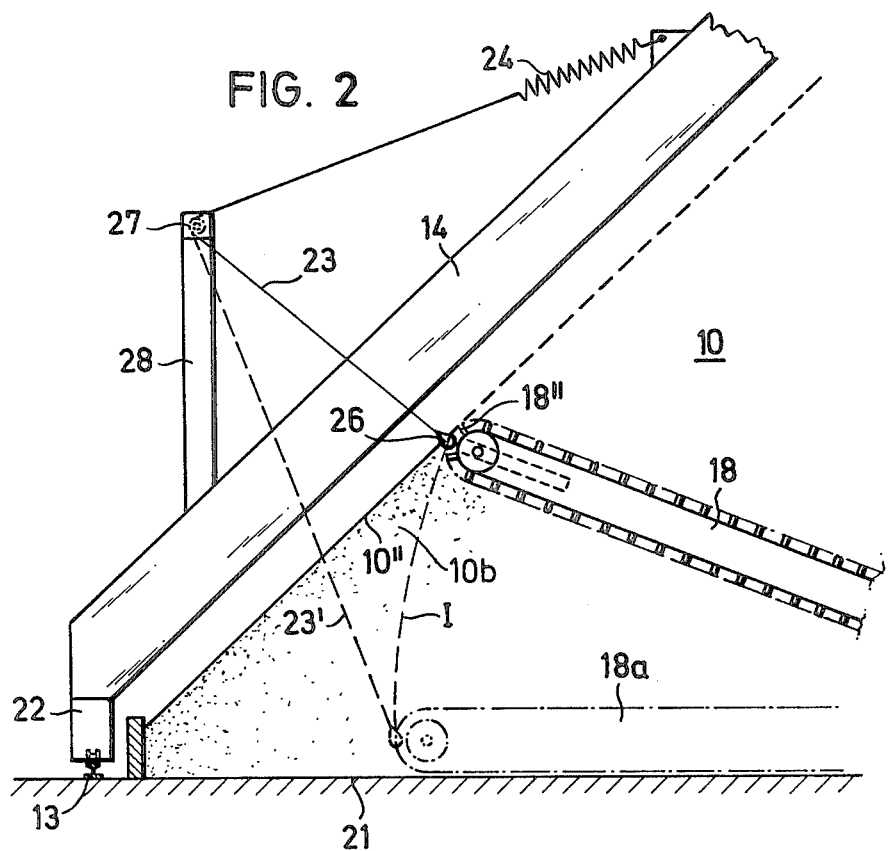
FIG. 2 is a perspective view of a preferred embodiment of a container handling apparatus according to the teachings of the invention.

Reference is now made to FIG. 2, which shows a device for diverting a container from a conveyor belt to an inspection point and for then returning it to the conveyor. There, a triangular drive section 2 supported on work table 22, by means which are not shown, is positioned over conveyor belt 4. Belt 4 is supported and moved towards drive section 2, in the direction shown by the arrow 6, by conventional support and driving structures which, in the interests of simplicity, are not illustrated. Triangular drive section 2 includes a supporting structure for maintaining three belt carrying rollers or wheels 8, 10 and 12 at the apices of a triangle, thus providing a triangular path for drive belt 14. Drive belt 14 can be a toothed timing belt, for example, or it may be a simple friction driven belt, as shown. It should, however, have a neoprene rubber, or other, like, surface which has a high coefficient of friction when in contact with the surface of a container being processed. As shown in FIG. 2, a back-support 16 is provided which rests on the inside of the belt between rollers 8 and 10 and 10 and 12 (not shown) to support the belt when a container, such as the bottle 18 of FIG. 2 is pressed against it by the action of infeed backup bar 20. Backup bar 20 is supported on work table 22 and comprises a backup plate 24 and a number of facing bars 26, made of a substance appropriate for contacting the container surface. The bars are supported on the container side of the backup bar by a foam backing. To accommodate containers of different sizes, it may be adjusted, by means not shown, towards or away from drive belt 14. The resilient support thus provided serves to maintain bottle 18 firmly pressed against, and in frictional engagement with, the surface of drive belt 14, as well as providing for some variation in container diameter. A similar structure is provided for outfeed backup bar 30 on the opposite side of triangular drive section 2 for maintaining a container 32 in contact with the surface of drive belt 14 when it is being returned to conveyor belt 4.

In a gap provided between the ends of backup bars 20 and 30 at the outer apex of triangular drive section 2, there are two idler wheels, which, together with the surface of drive belt 14 or drive wheel 10, cooperate to form a pocket. The first of these, infeed idler wheel 34, is urged towards the apex of triangular drive section 2 by tension from infeed idler spring 36 (shown in the schematic drawing of FIG. 3) acting on infeed idler arm 38. Idler arm 38 is pivotably supported on mount 40 carried by infeed backup bar 20. The second idler wheel, outfeed idler wheel 42, is mounted on brake assembly 44, which, in turn, is carried on outfeed idler support arm 46. Outfeed idler support arm 46 is urged inwardly towards the apex of triangle drive section 2 by a spring 48, which is preferably adjustable to accommodate different container sizes. It is preferred in this embodiment, as well as the others illustrated herein, to use surfaces providing a high coefficient of friction on the idler wheels, as will be understood by those skilled in the art.

It is a feature and an advantage of the embodiment of FIG. 2 that the work table 22 which supports the container during its travels off of belt 4 may be transparent in the region of the floor of the pocket so that the bottom of the container may be inspected through the table. Thus, the work table may be made of glass, or a glass insert may be inserted at the pocket, to permit the passage of light.

The structure of FIGS. 2 and 3 operates as follows. Containers, such as bottles, variously placed and spaced apart, are carried toward triangular drive section 2 by conveyor belt 4. When a container reaches triangular drive section 2, it contacts the moving surface of drive belt 14, is urged against it by the motion of the belt, and begins to move off of conveyor 4 towards the outer apex of drive section 2. As it moves, the surface of the container away from drive belt 14 comes into contact with bars 26 which form the active surface of backup bar 20. The container is, therefore, urged into engagement with drive belt 14 by backup bar 20 and rolls along the exposed surfaces of bars 26. When the container reaches the outer end of infeed backup bar 20, it comes into the pocket formed between drive wheel 10 and idler wheels 34 and 42. The container now stops and rotates, because idler wheels 34 and 42 are free to rotate and there is no fixed surface which the surface of the container can frictionally engage as a pivot point for rolling motion. The container continues to rotate in the pocket until brake 44 on idler 46 is actuated to stop idler wheel 42 from rotating. The necessary stationary surface now exists against which container 50 can roll and it begins to move again, pushing idler arm 46 back, so that it can leave the pocket and travel onto outfeed backup bar 30. Once on backup bar 30, the container continues to move, propelled by drive belt 14, until it arrives on conveyor 6 and is freed to be carried away.

Figure 3:
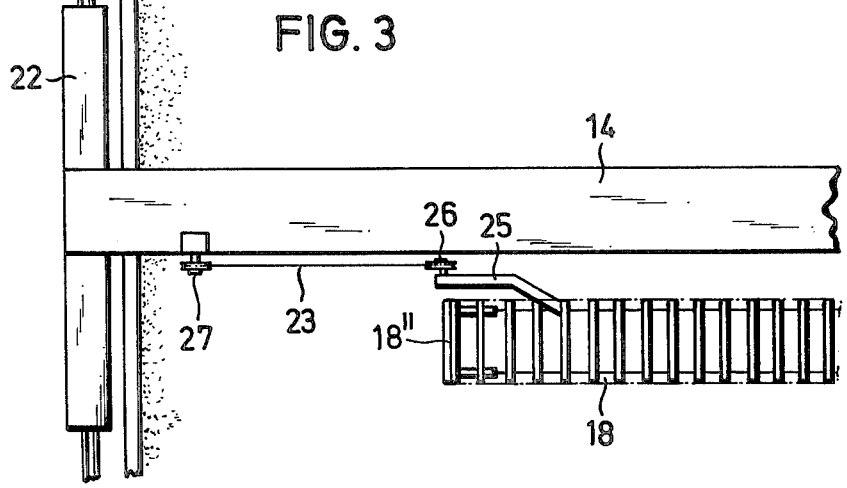
FIG. 3 is a schematic plan view of the apparatus of FIG. 1.
Figure 1:
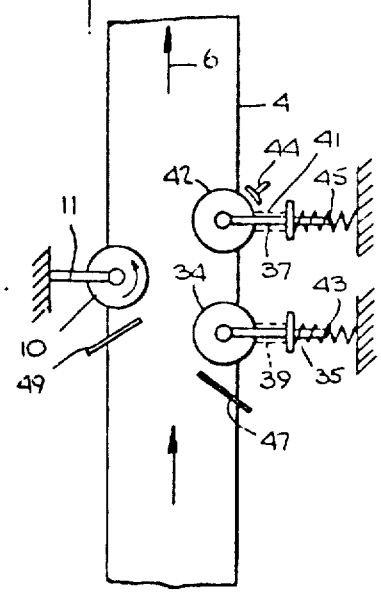
Figure 4:
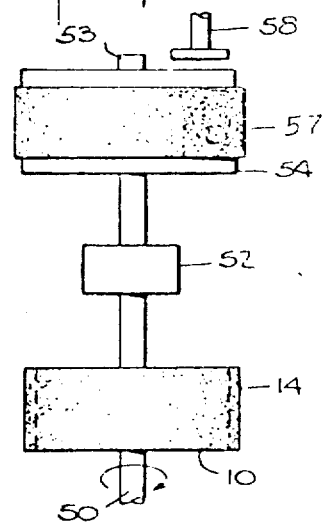
FIG. 4 is a side view of a drive wheel assembly for use with the invention.

FIG. 4 illustrates an alternative drive wheel for use in the device of FIGS. 2 and 3 which permits stoppping rotation of a container when it is in the pocket while permitting motion of other containers on the infeed or outfeed parts of the drive section to continue. In the arrangement of FIG. 4, rotary motion is supplied by a motor, not shown, to drive shaft 50, on which is mounted belt drive wheel 10 carrying belt 14, as before, and, which is coupled, via slip clutch 52, to a second drive wheel 54. Fitted onto the periphery of drive wheel 54 is a band or layer 57 of neoprene or rubber or other friction producing material. The curved surface formed by band or layer 57 should be slightly larger in radius than drive belt 14 where it curves around drive pulley 10, for reasons which will become clear below. Drive wheel 54 is also provided with a brake 58, shown schematically, which may be activated by a solenoid or by some other remote control device.

The arrangement of FIG. 4 operates by transferring the frictional engagement between drive belt 14 and the outer surface of the container from the surface of the drive belt to the surface of drive band 57 at about the time that the container begins to contact infeed idler 34. Then, when the container is in contact with both idler pullies 34 and 42, it is supported and frictionally turned by the surface of band 57 and its rotation may be stopped by the application of braking force from brake 58 to drive wheel 54 and the consequent slippage permitted by slip clutch 52. When rotation of the container is stopped, it is possible to perform operations such as volume measurement, pressure checks, or detailed visual inspections, which were not possible while the container was rotating.

It will be understood by those skilled in the art that the embodiments decribed above are well adapted for either manual or electrical control. Thus, the brake 44 on second idler wheel 42 and brakes 56 and 58, on drive wheels 10 (FIG. 1a) and 54 (FIG. 4) may be electrically actuated.

It will also be understood that a variable speed drive should be supplied for the drive wheel; in particular, the drive wheel of FIGS. 2 and 3 should be capable of moving the drive belt at a speed sufficient to move containers along the triangular path at the same rate as they are moved along the conveyor belt. In addition, it is to be specifically understood that the wheel drive illustrated in FIG. 1, for example, may be replaced by a belt looped around two spindles or wheels and having the straight side which is in frictional engagement with the container moving in the direction of the conveyor. In addition the drive section of the invention need not be triangular, since other configurations may be useful. Finally, much flexibility of application of the device is possible. For example, the drive section shown need not be placed over the path of the conveyor. It can be placed alongside of the conveyor and containers fed to it and returned from it by suitable deflectors located over the belt.

It will be evident, also, that the teachings of the invention are applicable to many production purposes. Thus, while the illustrative embodiments show its use, particularly, in connection with the inspection of bottles on a production line, it may be used, for example, to provide a work station for use in handling many different objects in the course of their manufacture. The below-appended claims should, therefore, be given an interpretation in keeping with the spirit of the invention rather than limited to the illustrative embodiments shown above.

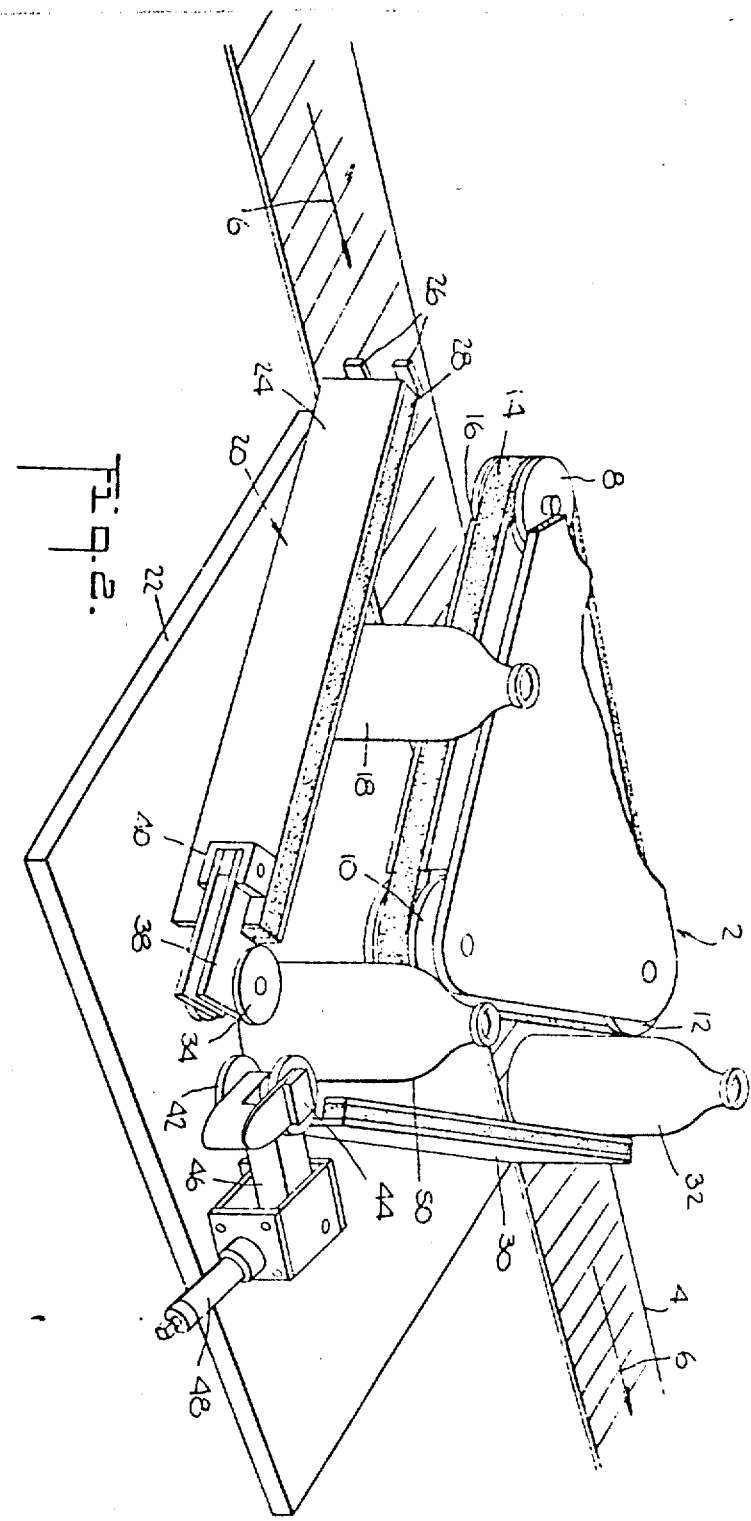

What is claimed is:

1. A device for interrupting movement of an object carried along a path established by a conveyor including:
   a pocket into which the object can move, defined by a peripheral surface on a drive means and a freely moving surface spaced apart from the peripheral surface and cooperating therewith to restrain motion in translation of an object between them;
   means for directing an object carried by the conveyor into the pocket;
   means for moving the peripheral surface of the drive means through the pocket in a direction tending to hold the object in the pocket; and means for stopping motion of the freely moving surface to cause the object to roll out of the pocket.

2. The device of claim 1 including resilient means for urging the freely moving surface towards the surface on the drive means.

3. The device of claim 1 and 2 including a supporting surface next to the conveyor which defines a surface of the pocket onto which the object can move and be supported when in the pocket.

4. The device of claim 1 as claimed in which the object is carried by a conveyor belt into the pocket.

5. A device for interrupting movement of an object carried along a path established by a moving conveyor belt including:
a pocket located in the path of an object carried on a conveyor belt and into which the object can move, the pocket defined by a peripheral surface on a drive means supported above and over one side of the belt and a freely moving surface supported above and extending over the other side of the belt;
means for moving the peripheral surface on the drive means through the pocket in the same direction as the belt; and
means for stopping motion of the freely moving surface to cause the object to roll out of the pocket.

6. The device of claim 5 further including:
means for producing relative motion of the drive means and the freely moving surface towards each other and for allowing them to separate to pass the object through.

7. A device for stopping movement of an object carried along a path established by a moving conveyor belt including:
a pocket defined by a peripheral surface on a drive means and peripheral surfaces on first and second idler means, the drive means being positioned over and at one side of a conveyor belt and the idler means being positioned over and at the other side of the conveyor belt;
guide means for laterally positioning an object on the conveyor belt;
means for moving the peripheral surface of the drive means which faces the idler means in the direction of motion of the conveyor belt; and
means for stopping rotational motion of the second idler means to provide a surface on which the object can roll out of the pocket.

8. The device of claim 7 including means for resiliently urging both idler means towards the path of travel of the object on the conveyor belt.

9. The device of claim 8 in which the guide means includes a stationary guide positioned above the belt on the side of the drive means and extending a distance across the belt to cause the object to deflect the first idler means.

10. The device of anyone of claims 7, 8, or 9 including means for stopping rotation of the drive means.

11. The device of any one of claims 7, 8, or 9 in which the surface on the drive means has a high coefficient of friction when engaging a surface on the object.

12. Apparatus for diverting a container from a conveyor belt and subsequently returning it to the belt including:
drive means positioned across the path of a container on a conveyor belt for diverting the container to a pocket and for returning the container from the pocket to the conveyor belt;
first and second backup members on either side of the pocket and cooperating with the drive means to establish a path along which the container is guided to the pocket and a path along which the container is guided from the pocket to the conveyor belt;
a first surface, proximate to the drive means, and first and second idler means having freely moving surfaces positioned opposite to the first surface and defining the pocket, both idler means being resiliently urged toward the first surface;
means for moving the first surface in the direction of travel of the container into the pocket; and
means for stopping rotation of the second idler to cause the container to roll out of the pocket for return to the conveyor belt.

13. The device of claim 12 including:
means for stopping motion of the first surface.

14. The device of claim 13 in which the means for stopping motion of the first surface is a brake.

15. The apparatus of claim 12 in which:
the drive means includes a moving belt having a portion for diverting the container to the pocket and a portion for returning the container to the conveyor belt; and
the pocket is located at a meeting point of the diverting portion and the return portion.

16. The apparatus of claim 15 further including:
a stationary surface located at one side of the conveyor belt onto which the container can travel and over which the pocket is located.

17. The device of claim 15 or claim 16 in which the drive means and the means for moving the first surface comprise:
a first wheel for moving the moving belt;
means for turning the first wheel;
a second wheel mounted on the same axis as the first wheel and having a peripheral surface which comprises the first surface, the radius of the second wheel being larger than the sum of the radius of the first wheel and the thickness fo the moving belt;
a clutch for coupling the first wheel to the second wheel; and
means for stopping rotation of the second drive wheel.

* * * * *

UNITED STATES PATENT AND TRADEMARK OFFICE
CERTIFICATE OF CORRECTION

PATENT NO. : 4,248,338
DATED : February 3, 1981
INVENTOR(S) : Leon E. Thompson

It is certified that error appears in the above—identified patent and that said Letters Patent is hereby corrected as shown below:

Column 7, line 6, change "and" to --or--;

line 10, change "as claimed" to --or claim 2--.

Column 8, line 1, change "anyone" to --any one--;

line 52, change "fo" to --of--.

Signed and Sealed this

Sixteenth Day of June 1981

[SEAL]

Attest:

RENE D. TEGTMEYER

*Attesting Officer*    *Acting Commissioner of Patents and Trademarks*

UNITED STATES PATENT AND TRADEMARK OFFICE
CERTIFICATE OF CORRECTION

PATENT NO. : 4,248,338

DATED : February 3, 1981

INVENTOR(S) : Leon E. Thompson

It is certified that error appears in the above—identified patent and that said Letters Patent is hereby corrected as shown below:

On the title page the descriptive Figure should appear as Figure 1. Figures 1, 2, 3 and 4 should appear as shown on the attached sheets.

Signed and Sealed this

Eighteenth Day of August 1981

[SEAL]

Attest:

Attesting Officer

GERALD J. MOSSINGHOFF

Commissioner of Patents and Trademarks